(12) United States Patent
Page

(10) Patent No.: US 6,891,574 B1
(45) Date of Patent: May 10, 2005

(54) HIGH SPEED VIDEO MIXER CIRCUIT

(75) Inventor: Ronald W. Page, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/129,255

(22) Filed: Aug. 4, 1998

(51) Int. Cl.⁷ .................................................. H04N 9/74
(52) U.S. Cl. ..................... 348/584; 348/705; 348/569
(58) Field of Search .............................. 348/705, 706, 348/584, 569, 600, 599, 598, 707

(56) References Cited

U.S. PATENT DOCUMENTS

| | | | | |
|---|---|---|---|---|
| 5,493,340 A | * | 2/1996 | Kim | 348/569 |
| 5,596,298 A | * | 1/1997 | Miller et al. | 329/337 |
| 5,689,309 A | * | 11/1997 | Nayebi et al. | 348/584 |
| 5,995,166 A | * | 11/1999 | Kawano | 348/691 |
| 6,212,369 B1 | * | 4/2001 | Avasarala | 455/333 |

* cited by examiner

*Primary Examiner*—Victor R. Kostak
(74) *Attorney, Agent, or Firm*—Stallman & Pollock LLP

(57) ABSTRACT

A video amplifier having an on-screen display (OSD) capability uses one channel of an OSD input video signal to generate a blanking signal for blocking output of a video signal. When the blanking signal is asserted, the OSD channels provide the on-screen display. The blanking signal is generated in a high speed mixer circuit including an emitter-coupled differential pair for amplifying the OSD input signal about an operating DC offset voltage and a pull down circuit for providing the blanking signal.

12 Claims, 6 Drawing Sheets

HIGH SPEED VIDEO MIXER CIRCUIT

CROSS REFERENCE TO RELATED APPLICATIONS

The present application is related to U.S. Pat. No. 6,512,553, entitled "ARCHITECTURE FOR A VIDEO PREAMPLIFIER WITH AN ON-SCREEN DISPLAY", by Ronald W. Page, filed on the same day as the present application, and assigned to National Semiconductor Corporation, which is also the assignee of the present application.

BACKGROUND OF THE INVENTION

1. Field of the Invention

The present invention relates to integrated circuits; and, in particular, the present invention relates to integrated circuit for driving a video display.

2. Discussion of the Related Art

A monitor used in a computer system is often equipped with a on-screen menu system to provide an "on-screen display" ("OSD") of one or more menus, showing current settings or functions of the monitor. When such a menu is displayed, an OSD window is typically created which interrupts or overlays at least a portion of the visible screen area of the video display. To achieve this overlay function, the video preamplifier is provided with a blanking capability which, when activated, inserts the OSD data in place of the video data while the video data is blanked.

FIG. 1 is a block diagram of a single-channel video preamplifier 100 in the prior art. As shown in FIG. 1, an analog signal representing one of the three color input signals or "channels" (R, G or B) is provided at terminal 101 as an input signal to video preamplifier 100. This analog signal is then amplified by an input amplifier 102. The amplified signal output of input amplifier 102 is then attenuated by video contrast attenuator 103 in accordance with a contrast attenuation signal at terminal 113 under user control. This contrast attenuation signal is typically provided externally and is common to all three channels. The contrast-attenuated signal is then adjusted in drive attenuator 104 in accordance with a channel-specific control signal at terminal 114. The output signal of drive attenuator 104 at terminal 116 is then amplified in output amplifier 105. The output signal at terminal 115 of output amplifier 105 is limited by an output signal of amplifier 106 ("clamp comparator") in response, when an external clamp signal at terminal 107 is asserted, to an externally imposed cutoff voltage at terminal 108. An external clamping capacitor (not shown) is provided coupled between terminal 109 and a reference voltage, typically ground or a supply voltage, to impose at terminal 109 a DC offset voltage to the output video signal at terminal 110. The attenuated video signal at terminal 116 is summed in amplifier 111 with the DC offset voltage at terminal 109, to provide at terminal 110 a video output signal. This video output signal at terminal 110 can be grounded by a blanking signal asserted at terminal 112. When the blanking signal at terminal 112 is asserted, i.e. the video output signal at terminal 110 is grounded, OSD data generated by an external OSD integrated circuit (not shown) is inserted at terminal 110 to provide the OSD overlay.

One disadvantage of video preamplifier 100 discussed above results from the timing and delay limitations of the blanking system, so that the quality of the on-screen display within the OSD window is compromised. In addition, in a typical high-frequency video signal path, a complex technique is necessary to inject the OSD data into terminal 110.

FIG. 2 is a block diagram of another prior art video preamplifier 200. To simplify description and to facilitate identification, like elements in video preamplifiers 100 and 200 are provided the same reference numerals. As shown in FIG. 2, in addition to the R, G or B input video signal at terminal 101, preamplifier 200 accepts also a corresponding R, G or B OSD input signal at terminal 209. In preamplifier 200, the video input signal received at terminal 101 is assumed to have a predetermined maximum dynamic amplitude of one volt, measured peak-to-peak. Thus, a 2-volt reference voltage ("black DC") is provided along with amplifiers 202 and 203 to clamp, when the signal at clamp gate terminal 107 is asserted, the input video signal at terminal 101 to a 2-volt DC offset or reference voltage. The video input signal of terminal 101 is thus provided at terminal 206 as an AC 700 mV peak-to-peak video signal superimposed on the DC offset voltage. The OSD input signal 209, originally at 0 to 4 volts peak-to-peak, is likewise amplified and provided with a DC offset voltage by amplifier 204, to provide an OSD input signal at terminal 207, also as an AC video signal having a maximum amplitude of 700 mV peak-to-peak. Under control of a select signal at terminal 205, a fast commutator or switch 201 is provided to select between the OSD input signal at terminal 207 and the video input signal at terminal 206. As in preamplifier 100 of FIG. 1, video contrast attenuators 103a and 103b are each provided for attenuating the corresponding one of the input video signal at terminal 206 and the input OSD signal at terminal 207. The remainder circuitry in preamplifier 200, i.e. drive attenuator 104 and amplifiers 105, 106 and 111, function in the same manner as the corresponding elements in FIG. 1 described above.

While video preamplifier 200 overcomes both the problem of poor quality on-screen display and the problem of complex OSD data insertion in video preamplifier 100, video preamplifier 200 is a more complex circuit having a higher power dissipation, a larger chip size and a higher pin count. Preamplifier 200 has a higher pin count because five pins are required per channel; namely, an R, G or B video input pin, an OSD input pin, an OSD/RGB select pin, a contrast pin and drive attenuation pin are required.

SUMMARY OF THE INVENTION

The present invention provides a high speed video mixer circuit for inserting into an output stage of a video preamplifier an OSD input video signal. The high speed video mixer circuit includes (i) a reference circuit generating a bias voltage; and (ii) an emitter-coupled differential pair, which receives as input signals a video signal and the bias voltage. The emitter-coupled differential pair of the high speed video mixer circuit provides a first output video signal, which corresponds substantially to AC portion of the video signal, and a second output signal amplifying the video signal.

In one embodiment of the present invention, the high speed video mixer circuit further includes a second reference circuit for generating a second bias voltage; and a bias circuit biasing the first output video signal about the second bias voltage.

In one embodiment, the high speed video mixer circuit further includes a voltage clamp which prevents an input transistor of the emitter-coupled differential pair from going into saturation. In one implementation, the voltage clamp includes a bipolar transistor which has a base terminal receiving the bias voltage at one of the input terminals of the emitter-coupled differential pair, and has an emitter terminal coupled to a collector terminal of the input transistor, such that the collector terminal of the input transistor is clamped at substantially one base-emitter voltage drop above the bias voltage.

The present invention is better understood upon consideration of the detailed description below in conjunction with the accompanying drawings.

DETAILED DESCRIPTION OF THE PREFERRED EMBODIMENTS

Figure 1:
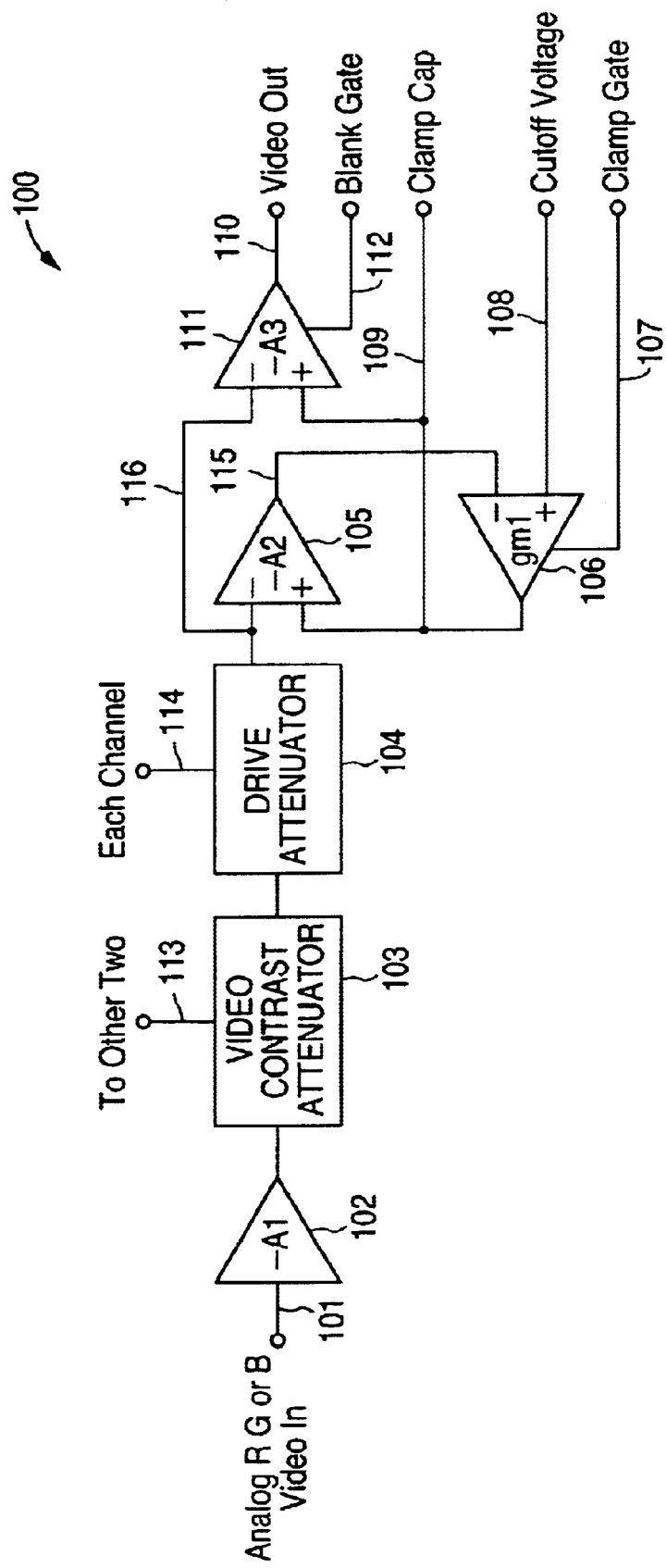
FIG. 1 is a block diagram of a single-channel video preamplifier 100 in the prior art.
Figure 2:
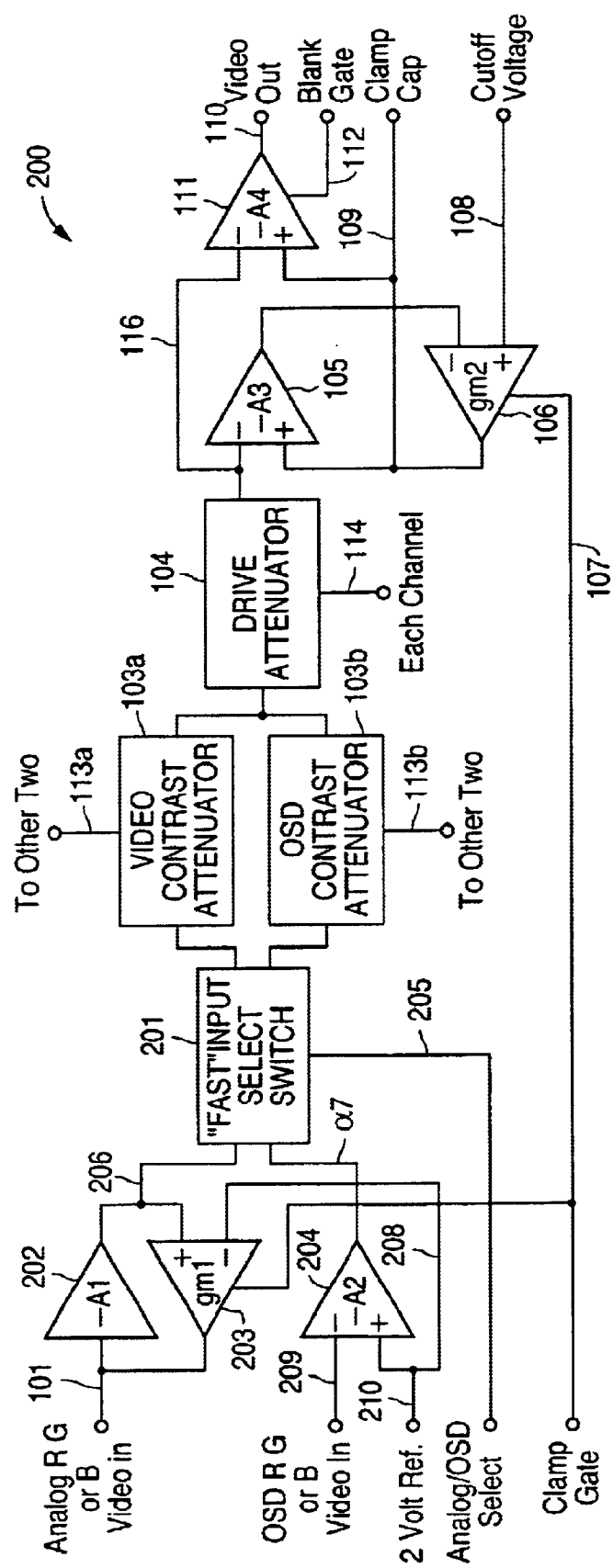
FIG. 2 is a block diagram of another prior art single-channel video preamplifier 200.

The present invention provides an integrated circuit video preamplifier with on-screen display (OSD) capability, while at the same time achieving a smaller chip size, lower power dissipation and smaller pin-count than the prior art video preamplifiers, such as video preamplifier 200 described above with respect to FIG. 2. The present invention also allows the OSD data to be displayed without incurring timing and delay limitations of the prior art video preamplifier 100 described above in conjunction with FIG. 1.

Figure 3:
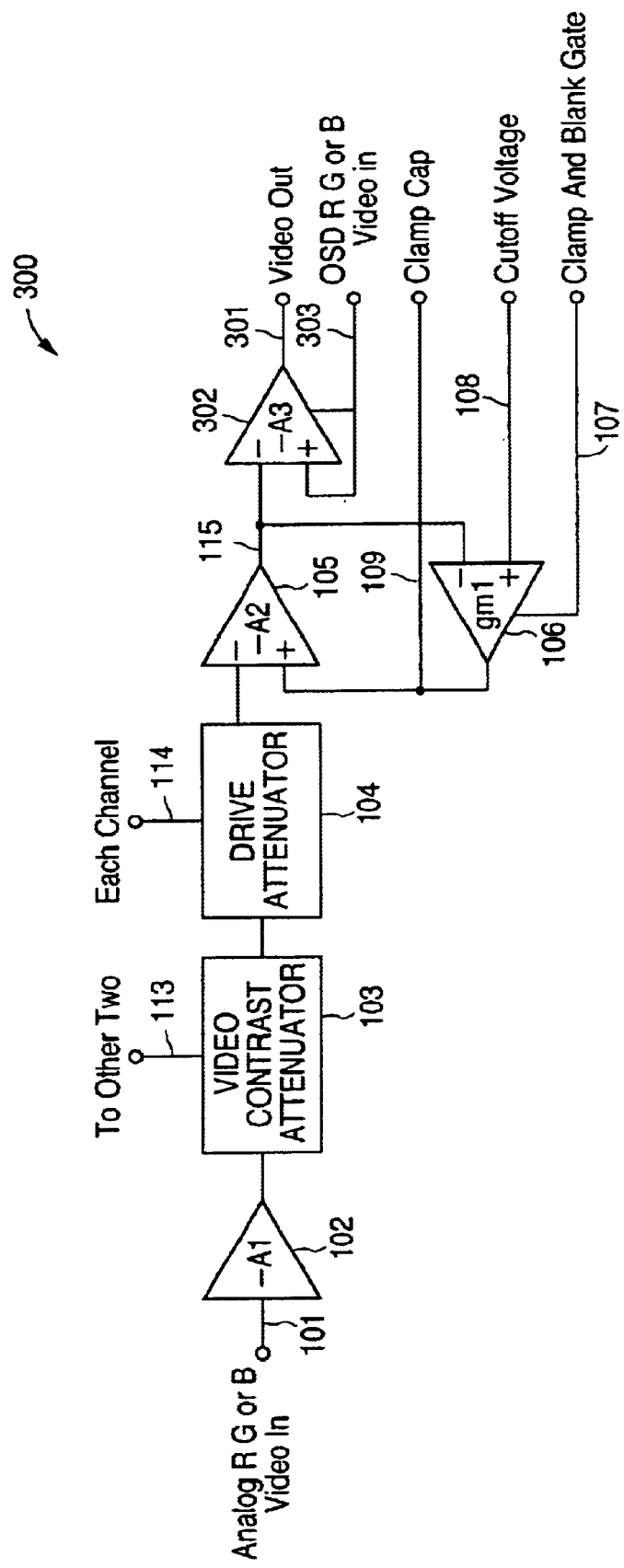
FIG. 3 is a block diagram of a single-channel video amplifier 300, in accordance with the present invention.

FIG. 3 is a block diagram of a single-channel video preamplifier 300 of the present invention. As shown in FIG. 3, an analog signal representing one of the three color input signals or "channels" (R, G or B) is provided as an input signal to preamplifier 300 at terminal 101. This analog signal is then amplified by an input amplifier 102. The amplified signal is then attenuated by video contrast attenuator 103 in accordance with a contrast attenuation signal at terminal 113 under user control. This contrast attenuation signal is typically provided externally and is common to all three channels. The contrast-attenuated signal is then adjusted in drive attenuator 104 in accordance with a channel-specific control signal at terminal 114. The output signal of drive attenuator 104 is then amplified in output amplifier 105. When an external clamp signal at terminal 107 is asserted, the output signal of output amplifier 105, provided at terminal 115, is limited by amplifier 106 according to an externally imposed cutoff voltage at terminal 108. An external clamping capacitor is coupled to terminal 109 to impose a DC offset voltage to the output video signal at terminal 115. The output video signal at terminal 115 is provided to a non-inverting input terminal of amplifier 302. Unlike video preamplifier 100 of FIG. 1, rather than a blanking signal, an OSD color signal is provided at terminal 303 as both the blanking control signal and a video input signal to a second non-inverting input terminal of amplifier 302. Amplifier 302 provides at terminal 301 the output video signal of preamplifier 300. In this embodiment, when OSD data is displayed, one of the OSD channels (i.e., signal at terminal 303) is provided at a relative high voltage to blank all video data input of all three channels. The remaining two OSD input signals in the two other channels are then used to drive the other two channels' respective output video signals to the video display.

Figure 4A:
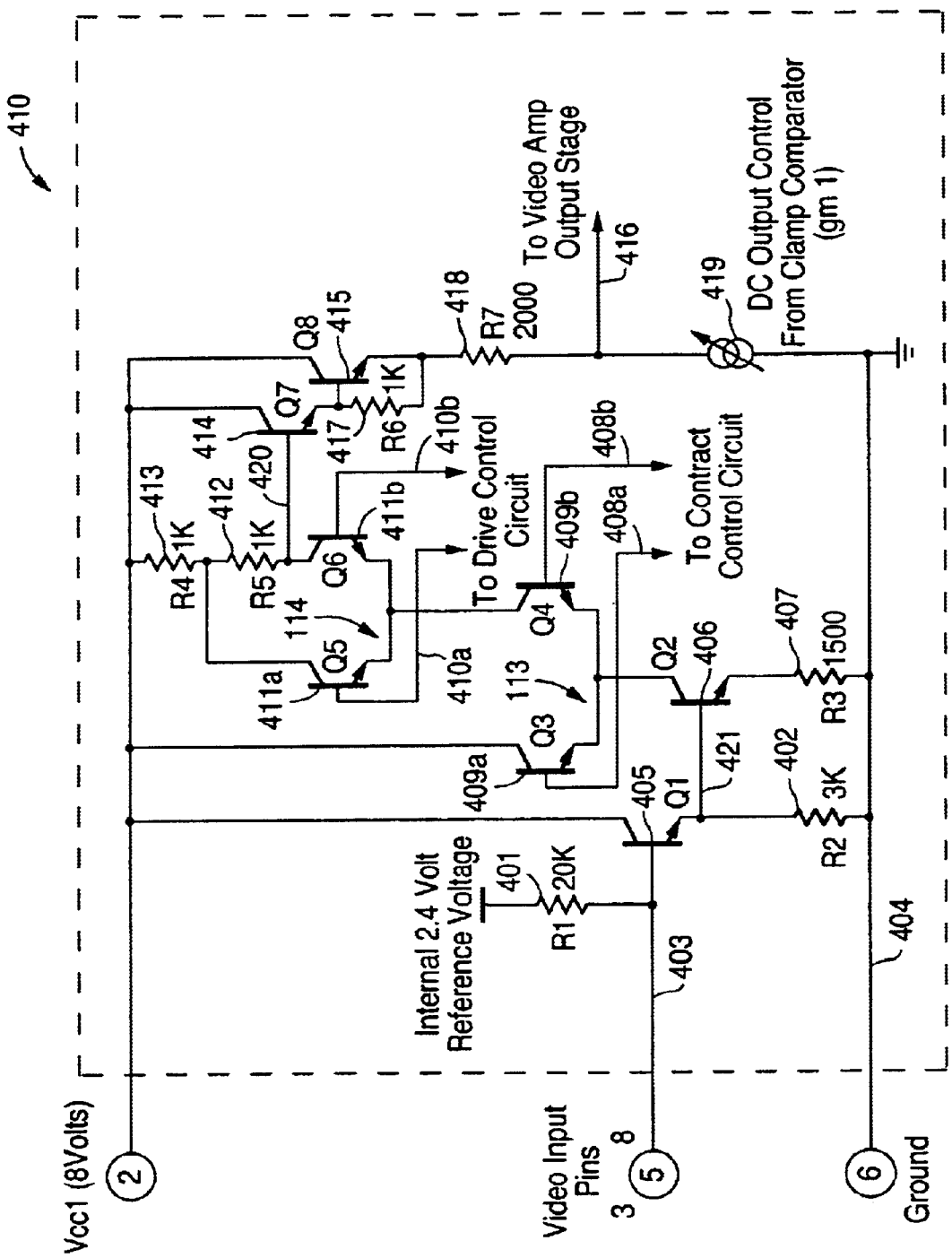
FIG. 4a shows an input stage 410 of video amplifier 400 for one channel of an input video signal, in one embodiment of the present invention.
Figure 4B:
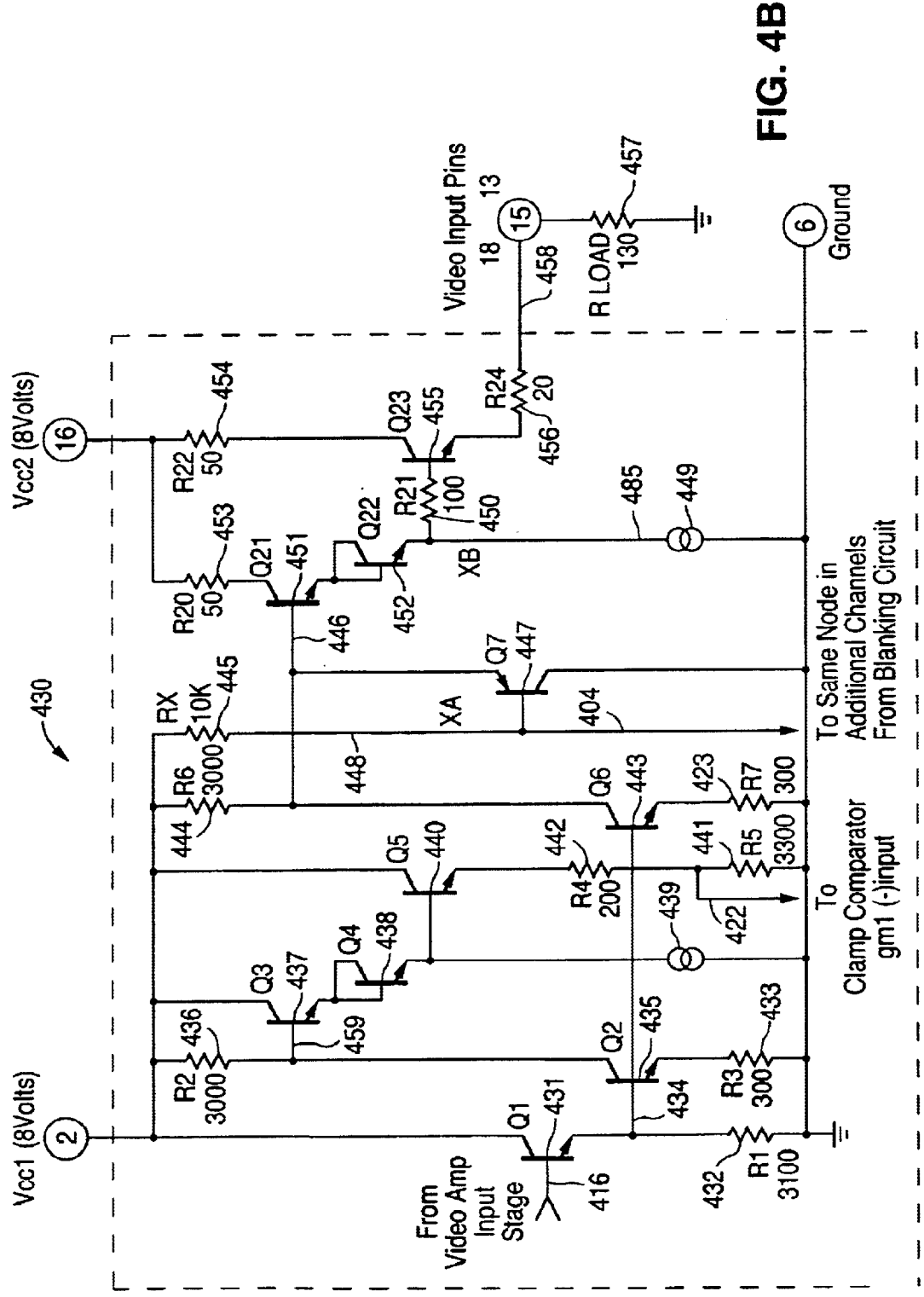
FIG. 4b shows an output stage 430 of video amplifier 400, for providing one channel of an output video signal.
Figure 4C:
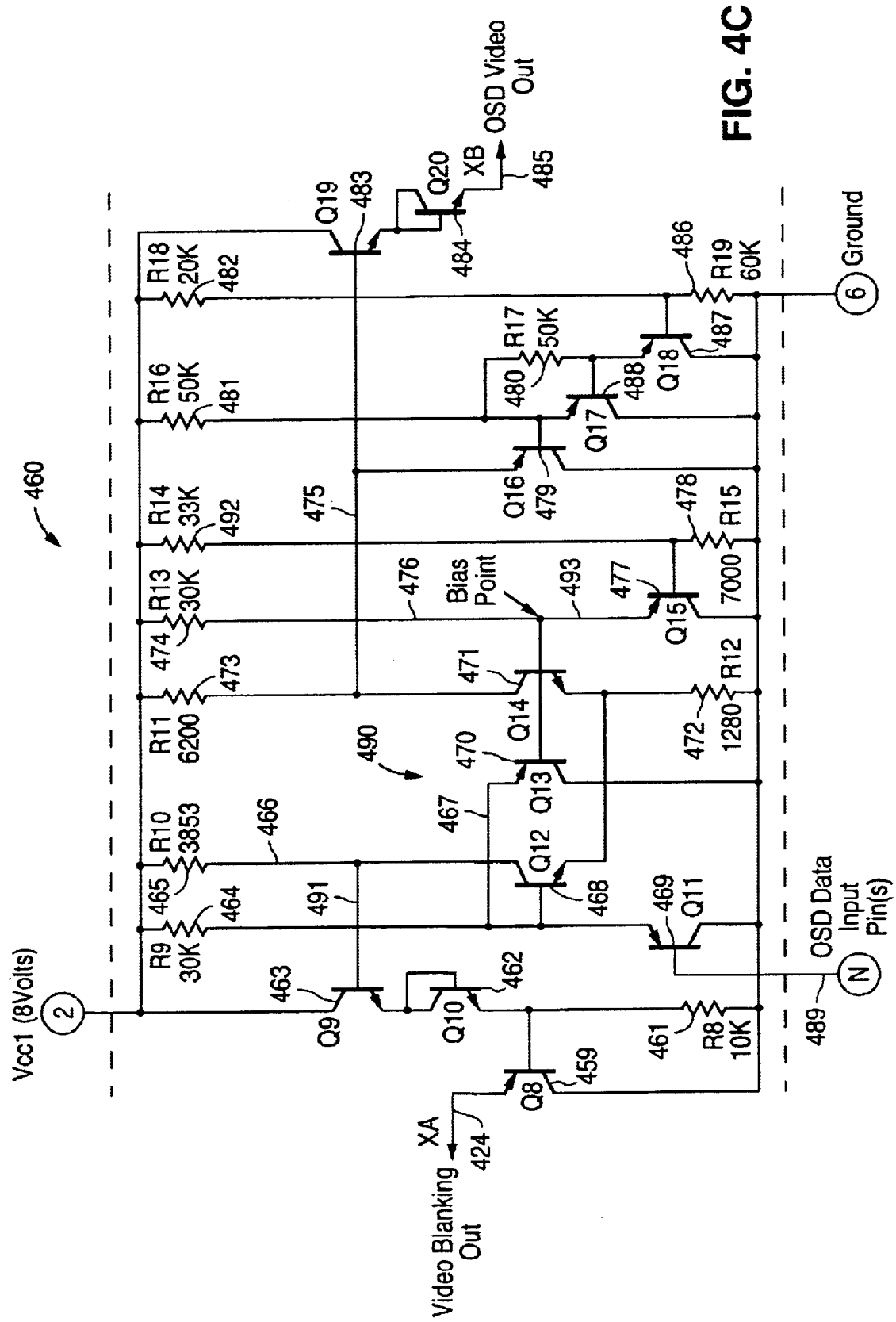
FIG. 4c shows an OSD input stage 460 of video amplifier, for one channel of an input OSD video signal.

One implementation of preamplifier 300 is shown in FIGS. 4a–4c, which are schematic circuits of a video amplifier circuit 400 in one embodiment of the present invention. FIG. 4a shows an input stage 410 of video amplifier 400 for one channel of an input video signal. As shown in FIG. 4a, a video input signal is provided at terminal 403, which is biased in this embodiment by resistor 401 to a DC offset reference voltage of 2.4 volts. The input video signal at terminal 403 is modulated by NPN transistor 405 and resistor 402 to provide a control voltage at the base terminal 421 of NPN transistor 406. The current in NPN transistor 406 is controlled by the control voltage at its base terminal 421 of NPN transistor 406 and limited by resistor 407, contrast attenuator 113 and drive control attenuator 114. In this embodiment, contrast attenuator 113 is an emitter-coupled amplifier consisting of NPN transistors 409a and 409b. Likewise, drive control attenuator 114 is an emitter-coupled amplifier consisting of NPN transistors 411a and 411b and resistors 412 and 413. An output signal, which corresponds to the video signal at base terminal 421 of NPN transistor 406, attenuated by contrast attenuator 113 and drive control attenuator 114, is provided at terminal 420. The output signal at terminal 420 is amplified to provide an output signal at terminal 416, using an output amplifier which consists of NPN transistors 414 and 415, resistors 417 and 418 and a current source 419. Feedback-controlled current source 419 limits the output DC voltage at terminal 416. Current source 419 is controlled by a conventional clamp comparator circuit (not shown) receiving a clamp voltage as an input signal to its non-inverting input terminal and an amplified output signal of input stage 410 as an input signal to its inverting terminal. The amplified output signal of input stage 410 which is supplied to the clamp comparator circuit is taken from output stage 430, which is shown in FIG. 4b below.

FIG. 4b is an output stage 430 of video amplifier 400, for providing one channel of the output video signal. As shown in FIG. 4b, the output signal at terminal 416 of input stage 410 is received into output stage 430 at the base terminal of NPN transistor 431 which, in conjunction with resistor 432 (connected between transistor 431's emitter terminal and ground), provides an amplified signal at terminal 434. The amplified signal at terminal 434 is applied to the base terminals of NPN transistors 435 and 443. NPN transistor 435, in conjunction with resistors 436 and 433, level-shifts the amplified signal at terminal 434 to provide a modulating signal at terminal 459. This modulating signal at terminal 459 modulates the current in current source 439 through NPN transistor 437 and diode 438, so as to provide a controlled current to the base terminal of NPN transistor 440. Together with the voltage divider of resistors 442 and 441, which are connected in series with the emitter terminal of NPN transistor 440, NPN transistor 440 provides at terminal 422 the feedback signal to the non-inverting input of the clamp comparator mentioned above.

The amplified signal at terminal 434 is also level-shifted by the action of NPN transistor 443 and resistors 423 and 444 to provide a level-shifted signal at terminal 446. This level-shifted signal at terminal 446 modulates, through NPN transistor 451 and diode 452, the current in current source 449 to provide a control current at the base terminal of NPN transistor 455. At terminal 485 of resistor 450, the control current is summed with an OSD input current signal, which is provided by an OSD input circuit 460 shown in FIG. 4c and described below. The summed signal at terminal 485 (signal XB) of resistor 450 is amplified by NPN transistor 455 to provide at terminal 458 the output signal of video output stage 430. Output load 457, resistor 454 and resistor 456 provide a DC quiescent operating voltage at terminal 458.

In output stage 430, an PNP transistor 447 is provided to pull terminal 446 near ground voltage, when a control signal at the base terminal 424 of PNP transistor 447 is asserted. By pulling terminal 446 to ground, the amplified input signal received at terminal 416 from input stage 410 is prevented from propagating through output stage 430. Base terminal 424 ("blanking input terminal") of PNP transistor 447 is connected in common with the base terminals of similarly provided PNP transistors in the other two channels. Thus, when the control signal at blanking input terminal 424 is asserted, the output signal from each channel (e.g. terminal 458 of video output stage 460 includes only the contribution by the corresponding OSD channel.

The OSD input signal for each channel is mixed into the video signal of the corresponding channel in output stage 430 by an OSD input circuit 460 shown in FIG. 4c. OSD input circuit 460 is a high speed video mixer circuit. As shown in FIG. 4c, one channel of an OSD input video signal is received into input circuit 460 at the base terminal 489 of PNP transistor 469 which, in conjunction with resistor 464, amplifies the input signal to drive one input terminal of an emitter-coupled amplifier 490. Emitter-coupled amplifier 490 consists of emitter-coupled NPN transistors 468 and 471, and resistors 465, 472 and 473. The other input terminal of emitter-coupled amplifier 490, i.e., base terminal 493 of NPN transistor 471 is biased by a reference voltage, which is created by amplifying the voltage at the voltage divider of resistors 492 and 478 in the amplifier consisting of PNP transistor 477 and resistor 474. PNP transistor 470 is provided to limit the voltage swing at the emitter terminal of PNP transistor 469 between ground voltage and a base-emitter voltage ($V_{BE}$) drop above the bias voltage at terminal 493, thereby preventing NPN transistor 468 from going into saturation.

In OSD input circuit 460, an non-inverting output signal is provided at the base terminal 491 of NPN transistor 463 which, in conjunction with diode 462 and resistor 461, provides an output control signal at the base terminal of PNP transistor 459. The emitter terminal of PNP transistor 459 is coupled to terminal 424, which is the common blanking input terminal for all three channels, as described above. Thus, when the OSD input signal received at terminal 489 of the PNP transistor 469 is held at a high voltage, the current flowing in NPN transistor 468 is increased, so that voltage at terminal 491 drops, resulting a decreased voltage at the base terminal of PNP transistor 459. PNP transistor 459 thus pulls the blanking input terminal to near ground voltage. As a result, PNP transistor 447 (FIG. 4b) pulls terminal 446 to near the ground reference, thereby blanking output circuit 460's input video signal.

An non-inverting output signal, corresponding to the OSD signal at input terminal 489 is tapped from terminal 475 of emitter-coupled amplifier 490. Terminal 475 is biased to have a DC offset voltage determined by the voltage divider of resistors 482 and 486 plus the approximate 3 $V_{BE}$' voltage drop contributed by PNP transistors 487, 488 and 479. The output voltage at terminal 475 modulates a current signal flowing in NPN transistor 483 and diode 484. This current signal, which represents an amplified signal of the OSD input video signal at terminal 489, is summed at terminal 485 (signal XB) of resistor 450 (FIG. 4b) with the amplified input video signal at terminal 446 to provide at terminal 458 the total output signal of output stage 430.

The above detailed description are provided to describe the specific embodiments of the present invention above, and is not intended to be limiting. Numerous variations and modifications are possible within the scope of the present invention. The present invention is defined by the following claims.

I claim:

1. A high speed video mixer circuit, comprising:

a reference circuit generating a DC bias voltage; and an emitter-coupled differential pair receiving as input signals a video signal and said DC bias voltage, said differential pair providing a first output video signal corresponding substantially to an AC portion of said video signal, said differential pair further providing a separate second output video signal amplifying said video signal about said DC bias voltage, whereby a voltage level of the first output video signal corresponds to a blanking signal for the second output video signal.

2. A high speed video mixer circuit as in claim 1, further comprising:

a second reference circuit for generating a second bias voltage; and a bias circuit biasing said first output video signal about said second bias voltage.

3. A high speed video mixer circuit as in claim 1, further comprising a voltage clamp, said voltage clamp preventing an input transistor of said differential pair from going into saturation.

4. A high speed video mixer circuit, comprising:

a reference circuit generating a bias voltage;

a differential pair receiving as input signals a video signal and said bias voltage, said differential pair providing a first output video signal corresponding to said video signal, and a second output signal amplifying said video signal; and a voltage clamp preventing an input transistor of said differential pair from going into saturation;

wherein said voltage clamp comprises a bipolar transistor having a base terminal receiving said bias voltage and having an emitter terminal coupled to a terminal of said input transistor, such that said terminal of said input transistor is clamped at substantially one base-emitter voltage drop above said bias voltage.

5. A high speed video mixer circuit, comprising:

an emitter-coupled amplifier receiving as input signals a first video signal and a bias voltage, said emitter-coupled amplifier providing a first output video signal corresponding to said first video signal, and a second output signal amplifying said first video signal; and a blanking circuit receiving as input said first output video signal and a ground reference, said blanking circuit providing a blanking output signal dependent upon a voltage level of the first output video signal.

6. A high speed video mixer circuit as in claim 5, wherein:

said blanking circuit provides a blanking output signal without the input of an external mixing control signal.

7. A high speed video mixer circuit as in claim 5, wherein:

said first video signal includes a single channel from multiple channels of video information, and wherein said single channel can include any of said multiple channels.

8. A high speed video mixer circuit as in claim 5, further comprising:

an output stage receiving as input signals said second output signal, said blanking output signal, and a secondary video input signal, said output stage generating a final video output signal including a contribution from at least one of the second output signal and the secondary video input signal, the contribution dependent upon the blanking output signal.

9. A high speed video mixer circuit as in claim 8, wherein:

said secondary video input signal includes information for a single channel from multiple channels of secondary video input, and wherein the contribution from the secondary video input signal further includes information for each of said multiple channels.

10. A high speed video mixer circuit as in claim 5, wherein:

said first video signal includes an on-screen display input video signal.

11. A high speed video mixer circuit as in claim 8, wherein:

said secondary video input signal includes at least one of an analog video signal and a digital video signal.

12. A high speed video mixer circuit as in claim 5, further comprising:

a voltage clamp preventing an input transistor of said emitter-coupled amplifier from going into saturation.

* * * * *